United States Patent
Seong et al.

(10) Patent No.: US 10,490,782 B2
(45) Date of Patent: Nov. 26, 2019

(54) RECHARGEABLE BATTERY AND CASE MANUFACTURING METHOD OF CASE INCLUDING THE SAME

(71) Applicant: SAMSUNG SDI CO., LTD., Yongin-si, Gyeonggi-do (KR)

(72) Inventors: Jae-Il Seong, Yongin-si (KR); Hideaki Yoshio, Yongin-si (KR); Ji-Won Yun, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 276 days.

(21) Appl. No.: 14/497,115

(22) Filed: Sep. 25, 2014

(65) Prior Publication Data
US 2015/0132636 A1   May 14, 2015

(30) Foreign Application Priority Data

Nov. 12, 2013 (KR) .................. 10-2013-0137172

(51) Int. Cl.
*H01M 2/02* (2006.01)
*H01M 2/04* (2006.01)
(Continued)

(52) U.S. Cl.
CPC ....... *H01M 2/0287* (2013.01); *H01M 2/0272* (2013.01); *H01M 2/0413* (2013.01); *H01M 2/022* (2013.01); *H01M 2/0491* (2013.01); *H01M 10/0422* (2013.01); *H01M 10/125* (2013.01); *H01M 2220/30* (2013.01); *Y10T 29/49115* (2015.01)

(58) Field of Classification Search
CPC .. H01M 2/022; H01M 2/0272; H01M 2/0413; H01M 10/0422; H01M 10/125; H01M 2220/30; H01M 2/0491

USPC ........................................... 429/185
See application file for complete search history.

(56) References Cited

U.S. PATENT DOCUMENTS

| | | | | |
|---|---|---|---|---|
| 4,107,403 A | * | 8/1978 | Takamura | H01M 2/08 429/174 |
| 2006/0093904 A1 | * | 5/2006 | Cheon | H01M 2/0413 429/163 |
| 2007/0154781 A1 | * | 7/2007 | Choi | H01M 2/0413 429/53 |

FOREIGN PATENT DOCUMENTS

| | | |
|---|---|---|
| KR | 2000-0015920 | 8/2000 |
| KR | 2002-0070586 | 9/2002 |

OTHER PUBLICATIONS

Machine translation of KR 20-1999-0000648, published on Aug. 16, 2000 to Hong-Gyu Kim.*

(Continued)

*Primary Examiner* — Milton I Cano
*Assistant Examiner* — Abibatu O Ojo-Amoo
(74) *Attorney, Agent, or Firm* — Lewis Roca Rothgerber Christie LLP

(57) ABSTRACT

A rechargeable battery capable of preventing rust generation at an opening side of a battery case. The rechargeable battery according to embodiments of the present invention includes: an electrode assembly; a case having an opening and accommodating the electrode assembly; and a cap assembly electrically connected to the electrode assembly, and coupled to an opening side of the case with a gasket interposed therebetween, wherein the opening side of the case includes a trimming end, a gap proximate the trimming end, and a coating layer on an inner surface of the gap proximate the trimming end.

12 Claims, 6 Drawing Sheets

(51) Int. Cl.
*H01M 10/12* (2006.01)
*H01M 10/04* (2006.01)

(56) References Cited

OTHER PUBLICATIONS

Machine translation of KR 20020070586 (KR100787417) by Kim GI Beom et al. ("Secondary Battery") (Year: 2002).*
Drawing of KR 20020070586 (KR 100787417) by Kim GI Beom et al. ("Secondary Battery") (Year: 2002).*

* cited by examiner

RECHARGEABLE BATTERY AND CASE MANUFACTURING METHOD OF CASE INCLUDING THE SAME

CROSS-REFERENCE TO RELATED APPLICATION

This application claims priority to and the benefit of Korean Patent Application No. 10-2013-0137172 filed in the Korean Intellectual Property Office on Nov. 12, 2013, the entire content of which is incorporated herein by reference.

BACKGROUND

1. Field

The described technology relates generally to a rechargeable battery.

2. Description of the Related Art

Recent technological developments and increase in demand for mobile devices have facilitated increase in demand for rechargeable batteries as an energy source. A cylindrical rechargeable battery usually includes an electrode assembly formed by placing electrodes on two surfaces of a separator and winding the electrodes and the separator in a form of a jelly roll, a case accommodating the electrode assembly, and a cap assembly electrically connected to the electrode assembly and sealing an opening side of the case.

The cap assembly may be coupled to the case by inserting a gasket between the opening side of the case and the cap assembly by a crimping process. In other words, the case holds an outer circumference of the cap assembly with a clamping part connected to a beading part positioned on the side of the opening of the case and depressed toward the center of the case.

At an initial stage of a beading process of forming the beading part, a centering process of matching a sleeve contacting the sides of the opening of the case, and the center of the case is performed. In other words, the sleeve and the center of the case are matched to each other by making the sleeve contact the sides of the opening of the case, and then rotating the case accordingly.

However, in this case, a trimming cross-section of the opening side of the case, which is in contact with the sleeve, may be worn out. Accordingly, even though an antirust processing is performed on the opening side of the case, the trimming cross-section may become worn out, thereby losing an antirust effect.

The above information disclosed in this Background section is only for enhancement of understanding of the background of the described technology and therefore it may contain information that does not form the prior art that is already known in this country to a person of ordinary skill in the art.

SUMMARY

Embodiments of the described technology are directed to a rechargeable battery capable of preventing an opening side of a case of the rechargeable battery from rusting. Embodiments of the present invention are also directed to a rechargeable battery having improved sealing performance of a gasket at an opening side of the case.

The rechargeable battery according to embodiments of the present invention is also capable of reducing or preventing a short circuit due to foreign metal substances at the opening side of the case.

Embodiments of the present invention are also directed to a manufacturing method of the case of the rechargeable battery.

Embodiments of the present invention provide a rechargeable battery including: an electrode assembly; a case having an opening and accommodating the electrode assembly, the case including a trimming end on sides of the opening, a gap proximate the trimming end, and a coating layer on an inner surface of the gap; and a cap assembly electrically connected to the electrode assembly and coupled to the sides of the opening with a gasket positioned between the cap assembly and the case.

The case may include: a beading part on an upper side of the case and depressed toward a center of the case; and a clamping part coupled to the beading part and holding an upper surface and a lower surface of the cap assembly, wherein the clamping part accommodates the gasket and the coating layer between the inner surface of the gap and the gasket.

The coating layer may be on an outer surface of the gap.

The case may include: a beading part on an upper side of the case and depressed toward a center of the case; and a clamping part coupled to the beading part and holding an upper surface and a lower surface of the cap assembly, wherein the clamping part accommodates the gasket and the coating layer between the inner surface of the gap and the gasket The coating layer may have a thickness of between about 5 to about 8 µm. The coating layer may include epoxy resin.

The coating layer may have a width smaller than a width of the gasket, the width of the coating layer and the width of the gasket both extending horizontally toward the center of the case.

Another exemplary embodiment provides a method of manufacturing a case of a rechargeable battery, including: molding a cylindrical case including an opening at one side, the opening configured to be deformed to accommodate an electrode assembly and hold a cap assembly; and forming a coating layer at a trimming end of the case and on an inner surface of a gap proximate the trimming end.

The coating step may include further forming the coating layer on an outer surface of the gap.

The coating step may include spraying epoxy resin with a spray nozzle.

As described above, according to the exemplary embodiments, the coating layer is formed at the trimming end of the case and on the inner surface of the gap proximate the trimming end, thereby preventing rust from generating at the opening side of the case. In one embodiment, the coating layer is formed of an insulating material to improve sealing performance of the gasket at the opening side of the case, and prevent a short circuit due to foreign metal substances permeating into the case.

DETAILED DESCRIPTION

Figure 1:
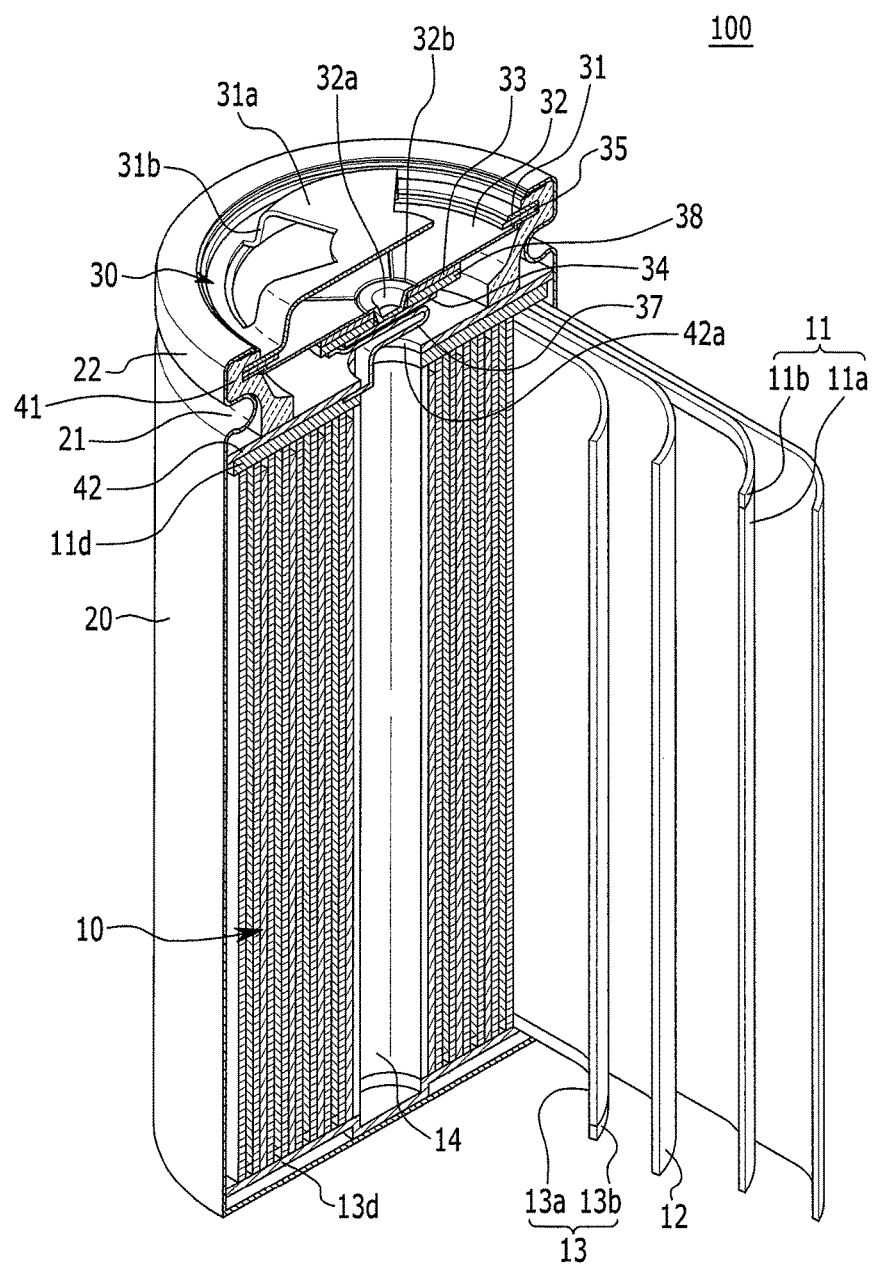
FIG. 1 is a cross-sectional perspective view of a rechargeable battery according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. Further, the use of "may" when describing embodiments of the present invention refers to "one or more embodiments of the present invention."

FIG. 1 is a cross-sectional perspective view of a rechargeable battery according to a first exemplary embodiment of the present invention. Referring to FIG. 1, a rechargeable battery 100 of the first exemplary embodiment includes an electrode assembly 10 configured to charge and discharge, a case 20 accommodating the electrode assembly 10, and a cap assembly 30 electrically connected to the electrode assembly 10 and coupled to the sides of the opening of the case 20 with a gasket 41 positioned between the cap assembly 30 and the case 20.

In one embodiment, the electrode assembly 10 includes a positive electrode 11, a separator 12, and a negative electrode 13, which are sequentially stacked. The electrode assembly 10 is formed by winding the positive electrode 11, the negative electrode 13, and the separator 12 acting as an insulator between the positive electrode 11 and the negative electrode 13, in a jelly roll configuration.

In one embodiment, the electrode assembly 10 may be formed in a cylindrical shape. The cylindrical electrode assembly 10 includes a sector pin 14 at a center thereof. The sector pin 14 is formed of a material having greater strength than that of the electrode assembly 10, in order to maintain the cylindrical shape of the electrode assembly 10.

The positive electrode 11 and the negative electrode 13 respectively include coated regions 11a and 13a, where an active material is applied on both surfaces of a current collector formed of a thin metal plate, such as Al or Cu, and uncoated regions 11b and 13b, where the active material is not applied and the current collector is exposed. Coated regions 11a and 13a and uncoated regions 11b and 13b are respectively positioned at opposite ends of the electrode assembly 10.

In a jelly roll configuration, a positive electrode current collecting plate 11d is electrically connected to the uncoated region 11b of the positive electrode 11 of the electrode assembly 10, and a negative electrode current collecting plate 13d is electrically connected to the uncoated region 13b of the negative electrode 13 of the electrode assembly 10.

In one embodiment, the case 20 includes an opening at its one side configured to accommodate the electrode assembly 10 inserted from the outside, and is formed in a cylindrical shape so as to accommodate the cylindrical electrode assembly 10. In one embodiment, the case 20 is connected to the negative electrode current collecting plate 13d to serve as a negative electrode terminal in the rechargeable battery 100, and may be formed of conductive metal, such as aluminum, an aluminum alloy, or nickel plated steel.

In one embodiment, the cap assembly 30 is coupled to the sides of the opening of the case 20 by interposing the gasket 41 that insulates the cap assembly 30 from the case 20, and the cap assembly 30 seals the opening of the case 20 after the electrode assembly 10 and an electrolyte solution have been accommodated therein. In one embodiment, the cap assembly 30 is electrically connected to the electrode assembly 10 through a current interrupting device.

In one embodiment, the cap assembly 30 includes a cap plate 31, a positive temperature coefficient (PTC) element 35, a vent plate 32, an insulating member 33, a middle plate 38, and a sub plate 34, which are sequentially positioned starting from the top toward the bottom of the case 20.

In one embodiment, the cap plate 31 is connected to the positive electrode current collecting plate 11d to serve as a positive electrode terminal in the rechargeable battery 100, and includes a protrusion 31a protruding outside of the case 20 and an exhaust opening 31b that forms an opening at the side of the protrusion 31a to discharge internal gas.

In one embodiment, the current interrupting device includes the vent plate 32 and the sub plate 34 connected to each other. The vent plate 32 and the sub plate 34 may be connected by welding.

In one embodiment, the vent plate 32 forming one side of the current interrupting device is installed inside the cap plate 31, to be electrically connected to the sub plate 34 forming the other side of the current interrupting device.

In one embodiment, the vent plate 32 includes a vent 32a. When an internal pressure of the rechargeable battery 100 reaches a predetermined pressure, the vent 32a is ruptured to discharge internal gas and interrupt the electrical connection with the sub plate 34.

In one embodiment, the vent 32a protrudes from the center of the vent plate 32 toward the inside of the case 20. The vent plate 32 may further include a notch 32b for easing the rupture of the vent 32a around the vent 32a.

When internal gas generated inside the case 20 increases the internal pressure of the case 20, the notch 32b is initially ruptured. Therefore, the internal gas of the rechargeable battery 100 is discharged to the outside through the ruptured vent 32a of the vent plate 32 and the exhaust opening 31b of the cap plate 31. Accordingly, it is possible to reduce or prevent the rechargeable battery 100 from exploding.

In the embodiments where the vent plate 32 and the sub plate 34 are separated due to the rupture of the vent 32a, the electrode assembly 10 and the cap plate 31 are electrically separated from each other.

In one embodiment, the positive temperature coefficient element 35 is installed between the cap plate 31 and the vent plate 32, thereby controlling a current flow between the cap plate 31 and the vent plate 32 according to an internal temperature of the rechargeable battery 100.

When the internal temperature of the rechargeable battery 100 reaches a predetermined temperature condition, the electric resistance of the positive temperature coefficient element 35 increases to approach infinity. Therefore, the positive temperature coefficient element 35 may interrupt a flow of a charging current or a discharging current between the cap plate 31 and the vent plate 32.

In one embodiment, the sub plate 34 faces the vent plate 32, and an insulating member 33 is interposed between the sub plate 34 and the vent plate 32 to be electrically connected to the vent 32a. The middle plate 38 is placed between the insulating member 33 and the sub plate 34. The vent 32a protrudes toward the inside of the case 20 through through-holes of the insulating member 33 and the middle plate 38 to be connected to the sub plate 34.

Accordingly, the middle plate 38 is electrically connected to the sub plate 34 and the vent 32a. In one embodiment, the middle plate 38 is also connected to a lead tab 37 by welding, and the lead tab 37, in turn, is connected to the positive electrode current collecting plate 11d by welding.

As a result, the positive electrode current collecting plate 11d is electrically connected to the cap plate 31 by sequentially passing through the lead tab 37, the sub plate 34, the middle plate 38, the vent 32a, the vent plate 32, and the positive temperature coefficient element 35. Accordingly, the cap plate 31 and the protrusion 31a may serve as the positive electrode terminals in the rechargeable battery 100.

In one embodiment, an insulating plate 42 is located between the positive electrode current collecting plate 11d and the sub plate 34, to electrically insulate the positive electrode current collecting plate 11d from the sub plate 34 and the middle plate 38, and to electrically insulate the electrode assembly 10 from the case 20.

In one embodiment, the lead tab 37 is connected to the positive electrode current collecting plate 11d and passes through a through-hole 42a of the insulating plate 42 to be connected to the middle plate 38. In the cap assembly 30, the lead tab 37 and the middle plate 38, and the vent 32a and the sub plate 34, may be respectively connected by welding.

In embodiments where the electrode assembly 10 is inserted into the case 20, the cap assembly 30 described above may be coupled to the sides of the opening of the case 20 with the gasket 41 interposed therebetween, and may be fixed to the sides of the opening of the case 20 through a crimping process.

In one embodiment, a beading part 21 is formed on a side of the opening of the case 20 through a beading process, and a clamping part 22 is connected to the beading part 21 and is formed through the crimping process. In other words, the case 20 of the rechargeable battery 100 includes the beading part 21 and the clamping part 22.

In embodiments where the electrode assembly 10 is accommodated in the case 20, the beading part 21 is coupled to an outer upper side of the case 20 and is depressed to horizontally protrude toward the center of the case 20.

In one embodiment, the clamping part 22 is connected to the beading part 21 and protrudes further toward the center of the case 20 than the protrusion of the beading part 21. The clamping part 22, the beading part 21, and the gasket 41 therebetween, together hold an outer surface of the electrode assembly 10, and an upper surface and a lower surface of the cap assembly 30.

Figure 2:
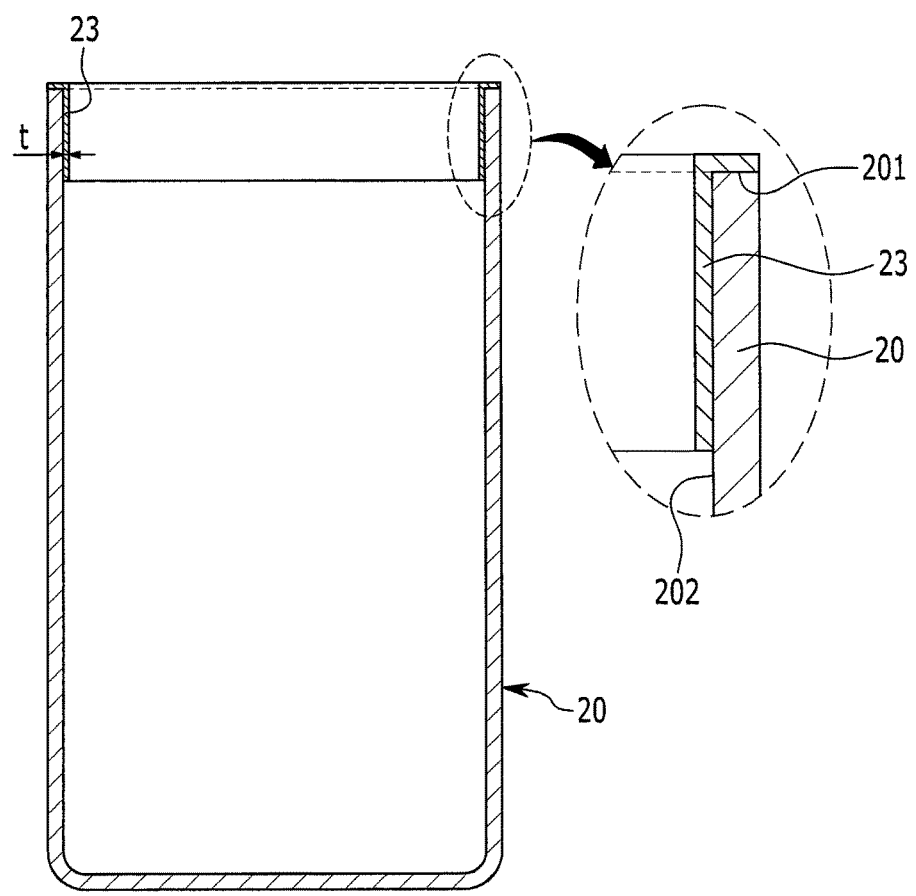
FIG. 2 is a cross-sectional schematic view of a case of the rechargeable battery of FIG. 1 before a beading process.

FIG. 2 is a schematic cross-sectional view of the case of FIG. 1 before the beading process. Referring to FIG. 2, before the beading process, the case 20 includes a trimming end 201 and a cylindrical gap proximate the trimming end 201, and a coating layer 23 formed on an inner surface 202 of the gap proximate the trimming end 201.

In one embodiment, the coating layer 23 may be coated with epoxy resin to have a thickness t of between about 5 to 8 μm. When the thickness of the coating layer 23 is within this range, a thickness of the case 20 may be about 0.25 mm. In one embodiment, a coating material for forming the coating layer 23 may be bisphenol A-type epoxy resin.

When the thickness t of the coating layer 23 is smaller than 5 μm, an antirust effect may deteriorate in the opening of the case 20 due to a shortage in thickness and a thickness error, and when the thickness t of the coating layer 23 is larger than 8 μm, the coating material may be excessively used, and adhesion between the case 20 and the gasket 41 may deteriorate.

In one embodiment, the coating layer 23 formed of the epoxy resin brings the opening of the case 20 and the gasket 41 closer together, thereby preventing a short circuit due to foreign metal substances permeating into the opening of the case 20.

Figure 3:
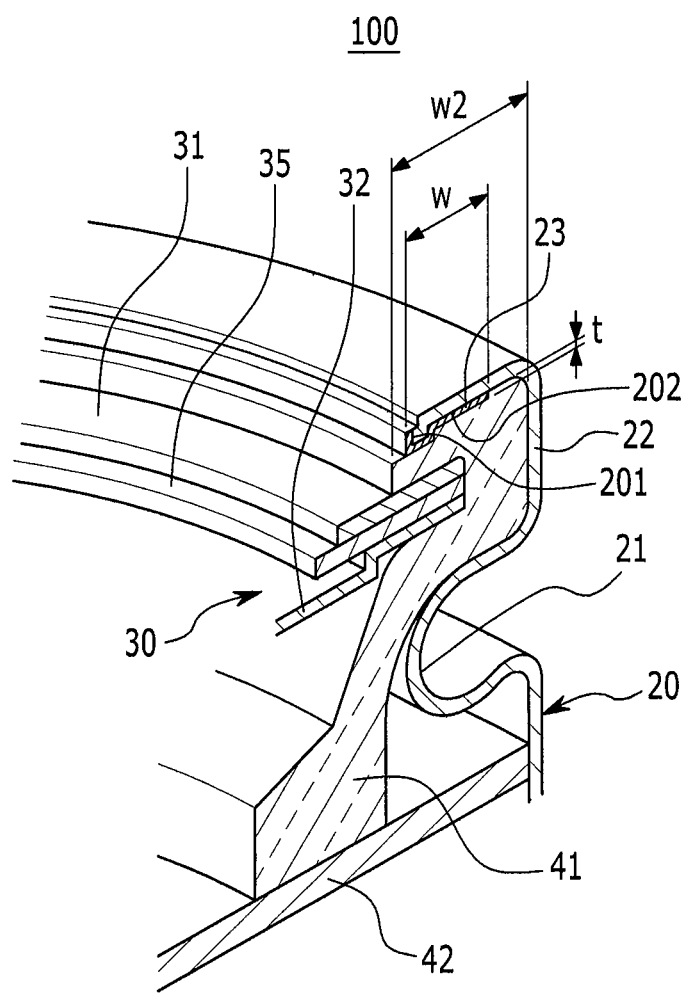
FIG. 3 is a partial cross-sectional perspective view of an opening side of the case of FIG. 1 after a beading process.

FIG. 3 is a partial cross-sectional perspective view of the opening side of the case of FIG. 1, after the beading process. Referring to FIG. 3, after the beading process, the coating layer 23 is positioned between an inner surface 202 of the gap proximate the trimming end 201 and the gasket 41, which face each other in the clamping part 22.

Since the trimming end 201 at the opening side of the case 20 is a part having highest chance of generating rust, in embodiments of the present invention, the coating layer 23 may be also provided at the trimming end 201 to maintain an antirust effect.

In one embodiment, the coating layer 23 on the inner surface 202 of the gap proximate the trimming end 201, further reduces or prevents rust generation or a short circuit due to moisture or foreign metal substances permeating into a space between the inner surface 202 and the gasket 41.

In one embodiment, the coating layer 23 is continuously formed on the inner surface 202 and the trimming end 201, thereby further improving adhesive strength between the case 20 and the coating layer 23. Accordingly, the coating layer 23 may maintain a long term antirust effect and short circuit prevention effect at the opening side of the case 20 of the rechargeable battery 100.

In one embodiment, the coating layer 23 has a width W extending horizontally toward the center of the case 20, and the width W is smaller than a width W2 of the gasket 41 also extending horizontally toward the center of the case 20.

When the width W of the coating layer 23 is smaller than the width W2 of the gasket 41, waste of the coating material may be prevented. In addition, the antirust effect and the short circuit prevention effect at the trimming end 201, as well as the adhesive strength between the coating layer 23 and the case 20, may be maximally maintained.

In embodiments where the thickness of the case 20 is about 0.25 mm, and the thickness t of the coating layer 23 is about 5 to 8 μm as described above, the width W of the coating layer 23 may be about 0.5 to 1 mm.

Hereinafter, another exemplary embodiment of the present invention will be described, and a description of the same configurations as those of the first exemplary embodiment will not be provided again, and only different configurations will be described.

Figure 4:
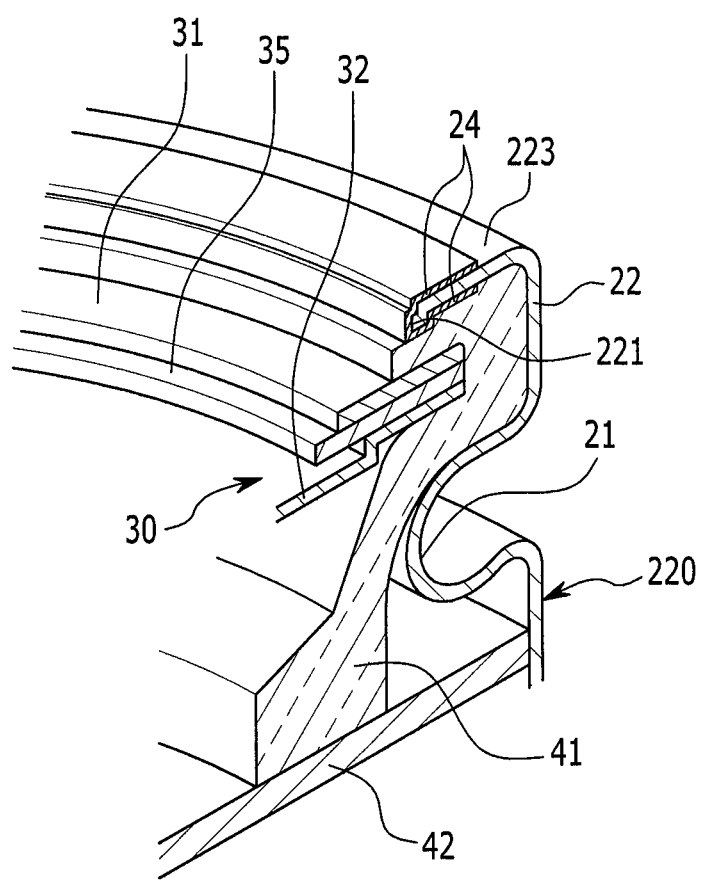
FIG. 4 is a partial cross-sectional perspective view of an opening side of a case in a rechargeable battery according to a second exemplary embodiment of the present invention, after a beading process.
Figure 5:
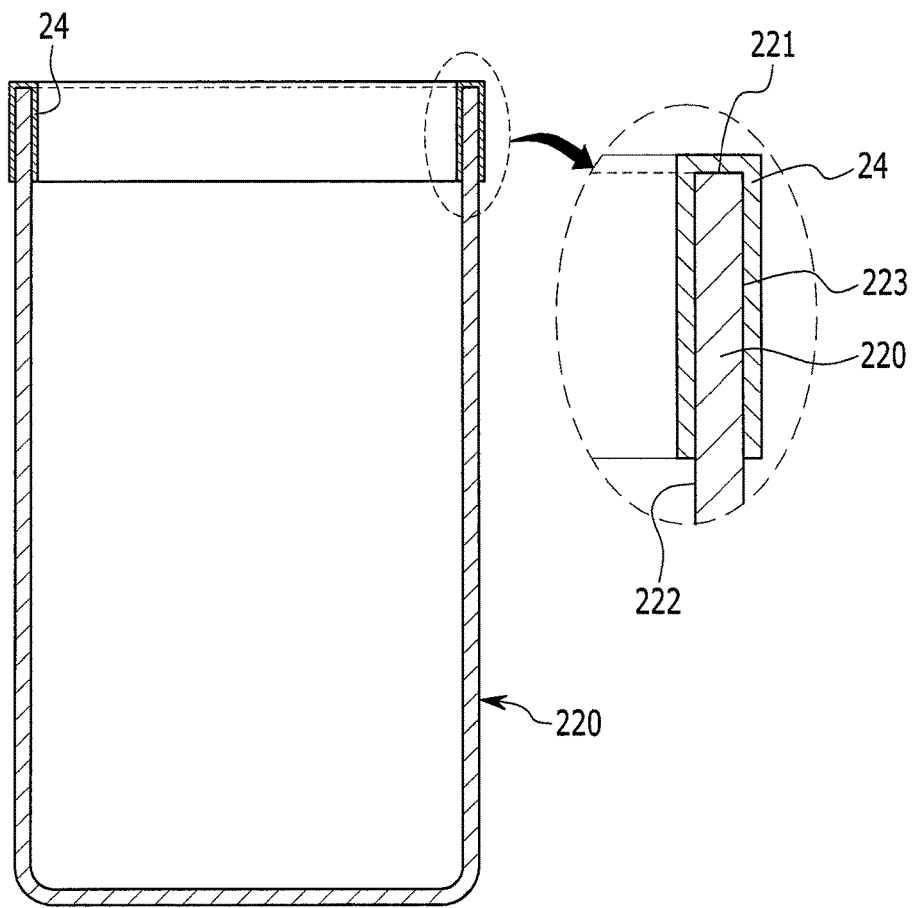
FIG. 5 is a cross-sectional schematic view of the case of FIG. 4 before a beading process.

FIG. 4 is a partial cross-sectional perspective view of an opening side of a case in a rechargeable battery according to a second exemplary embodiment of the present invention, after the beading process, and FIG. 5 is a cross-sectional view of the case of FIG. 4 before a beading process.

Referring to FIGS. 4 and 5, in a rechargeable battery 200 of the second exemplary embodiment, a coating layer 24 is also formed on an outer surface 223 of a gapproximate a trimming end 221. In other words, the coating layer 24 is formed on the trimming end 221, and on an inner surface 222 and the outer surface 223 of the gap proximate the trimming end 221.

In other words, the coating layer 24 is positioned between the inner surface 222 of the gap proximate the trimming end 221 and a gasket 41 facing the inner surface 222 in a clamping part 22, and is also positioned on the outer surface 223 of the gap proximate the trimming end 221. Accordingly, the coating layer 24 may further improve an antirust effect at the trimming end 221 and the outer surface 223.

In one embodiment, the coating layer 24 is continuously formed on the inner surface 222, the trimming end 221, and the outer surface 223, thereby further improving adhesive strength between the case 220 and the coating layer 24. Accordingly, the coating layer 24 may maintain a long term antirust effect and a short circuit prevention effect at the opening side of the case 220 of the rechargeable battery 200.

Hereinafter, a manufacturing method of a case of a rechargeable battery will be described. For convenience, the manufacturing method will be described with respect to the case 220 used in the rechargeable battery 200 in the second exemplary embodiment.

Figure 6:
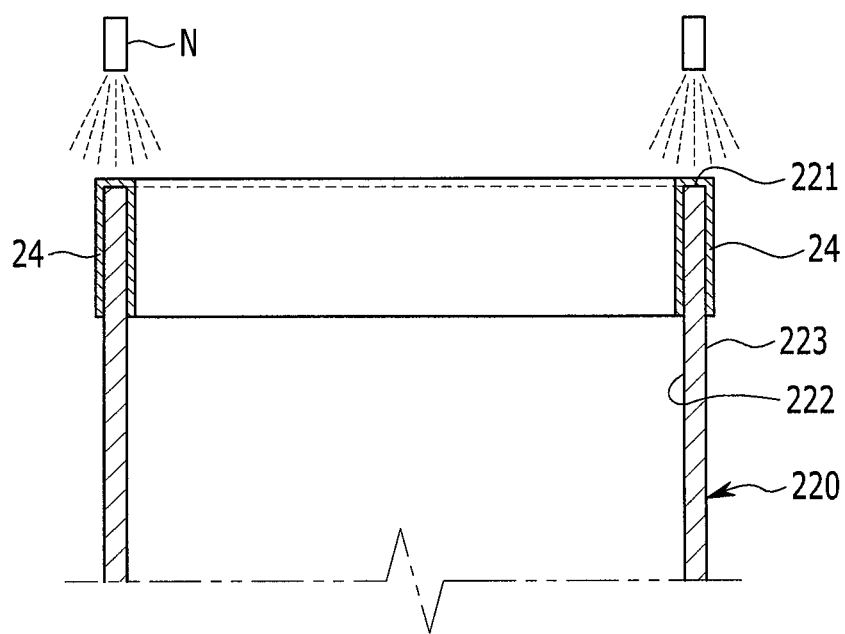
FIG. 6 is a cross-sectional schematic view of a manufacturing method of the case of the rechargeable battery according to the exemplary embodiments of the present invention.

FIG. 6 is a cross-sectional schematic view of the manufacturing method of the case of the rechargeable battery according to an embodiment of the present invention. Referring to FIG. 6, the manufacturing method of the case of the rechargeable battery includes a molding step of molding the cylindrical case 220, and a coating step of forming a coating layer 24 at the side of the opening of the case 220.

In one embodiment, in the molding step, the cylindrical case 220 may be molded by a deep drawing method of molding the case using a board, and an impact method.

In the coating step, the coating layer 24 may be formed at the trimming end 221 of the case 220 and on the inner surface 222 and the outer surface 223 of the gap proximate the trimming end 221. In one embodiment, in the coating step, the coating layer 24 may be formed by a spray method of spraying epoxy resin or bisphenol A-type epoxy resin with a spray nozzle N.

In one embodiment, the coating layer may also be formed at the trimming end of the opening of the case, and on the inner surface of the gap proximate the trimming end with a sponge stamp.

The spray method illustrated in FIG. 6 may effectively form the coating layer 24 on the inner and outer surfaces 222 and 223 of the gap proximate the trimming end 221 at the opening side of the case 220 of the second exemplary embodiment, and the sponge stamp method may effectively form the coating layer 23 on the inner surface 202 of the gap proximate the trimming end 201 at the opening side of the case 20 of the first exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

DESCRIPTION OF SYMBOLS

| | |
|---|---|
| 10: Electrode assembly | 11, 13: Positive and negative electrodes |
| 11a, 13a: Coated region | 11b, 13b: Uncoated region |
| 11d, 13d: Positive and negative electrode current collecting plates | |
| 12: Separator | |
| 13: Negative electrode | 14: Sector pin |
| 20, 220: Case | 21: Beading part |
| 22: Clamping part | 23, 24: Coating layer |
| 30: Cap assembly | 31: Cap plate |
| 31a: Protrusion | 31b: Exhaust opening |
| 32: Vent plate | 32a: Vent |
| 32b: Notch | 33: Insulating member |
| 34: Sub plate | |
| 35: Positive temperature coefficient (PTC) element | |
| 37: Lead tab | 38: Middle plate |
| 41: Gasket | 42: Insulating plate |
| 42a: Through-hole | 100, 200: Rechargeable battery |
| 201, 221: Trimming end | 202, 222: Inner surface |
| t: Thickness | 223: Outer surface |
| W, W2: Width | |

What is claimed is:

1. A rechargeable battery, comprising:
an electrode assembly;
a case having a bottom and sidewalls accommodating the electrode assembly, an end portion of the sidewalls comprising a trimming end that is folded to extend toward a center of the case, the trimming end having an inner surface facing the electrode assembly, an outer surface opposite the inner surface, and an edge surface extending perpendicularly therebetween, and wherein the trimming end comprises a coating layer on the edge surface and the inner surface and extending along only the trimming end;
a cap assembly electrically connected to the electrode assembly and positioned between the electrode assembly and the trimming end; and
a gasket located between the cap assembly and the case, wherein the coating layer on the inner surface of the trimming end directly contacts the gasket.

2. The rechargeable battery of claim 1, wherein:
the case further comprises:
a beading part on an upper side of the case and depressed toward a center of the case; and
a clamping part coupled to the beading part and holding an upper surface and a lower surface of the cap assembly, wherein the clamping part accommodates the gasket and the coating layer between the inner surface of the trimming end and the gasket.

3. The rechargeable battery of claim 1, wherein the coating layer is on the outer surface of the trimming end of the case.

4. The rechargeable battery of claim 3, wherein:
the case further comprises:
a beading part on an upper side of the case and depressed toward a center of the case; and
a clamping part coupled to the beading part and holding an upper surface and a lower surface of the cap assembly, wherein the clamping part accommodates the gasket and the coating layer between the inner surface of the trimming end and the gasket.

5. The rechargeable battery of claim 1, wherein the coating layer has a thickness of between about 5 to about 8 μm.

6. The rechargeable battery of claim 1, wherein the coating layer comprises epoxy resin.

7. The rechargeable battery of claim 1, wherein a width of the coating layer is smaller than a width of the gasket, the width of the coating layer and the width of the gasket both extending toward the center of the case.

8. A rechargeable battery, comprising:
an electrode assembly;
a case having a bottom and sidewalls accommodating the electrode assembly, an end portion of the sidewalls comprising a trimming end that is folded to extend toward a center of the case, the trimming end having an inner surface facing the electrode assembly, an outer surface opposite the inner surface, and an edge surface extending perpendicularly therebetween, wherein the trimming end comprises a coating layer on the edge surface, the inner surface and on the outer surface of the trimming end;
a cap assembly electrically connected to the electrode assembly and positioned between the electrode assembly and the trimming end; and
a gasket positioned between the cap assembly and the case, wherein the coating layer on the inner surface of the trimming end directly contacts the gasket.

9. The rechargeable battery of claim 8, wherein:
the case further comprises:
a beading part on an upper side of the case and depressed toward a center of the case; and
a clamping part coupled to the beading part and holding an upper surface and a lower surface of the cap assembly, wherein the clamping part accommodates the gasket and the coating layer between the inner surface of the trimming end and the gasket.

10. The rechargeable battery of claim 8, wherein the coating layer has a thickness of between about 5 to about 8 μm.

11. The rechargeable battery of claim 8, wherein the coating layer comprises epoxy resin.

12. The rechargeable battery of claim 8, wherein a width of the coating layer is smaller than a width of the gasket, the width of the coating layer and the width of the gasket both extending toward the center of the case.

* * * * *